(12) United States Patent
Wang et al.

(10) Patent No.: US 11,916,847 B2
(45) Date of Patent: *Feb. 27, 2024

(54) METHODS AND APPARATUSES FOR UPLINK SIGNAL RECEIVING AND TRANSMISSION

(71) Applicant: NEC CORPORATION, Tokyo (JP)

(72) Inventors: Gang Wang, Beijing (CN); Jiangnan Zhang, Beijing (CN); Kaili Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 82 days.

This patent is subject to a terminal disclaimer.

(21) Appl. No.: 17/366,610

(22) Filed: Jul. 2, 2021

(65) Prior Publication Data

US 2021/0336825 A1 Oct. 28, 2021

Related U.S. Application Data

(63) Continuation of application No. 16/479,255, filed as application No. PCT/CN2017/072671 on Jan. 25, 2017, now Pat. No. 11,088,886.

(51) Int. Cl.
*H04L 27/26* (2006.01)
*H04L 5/00* (2006.01)

(52) U.S. Cl.
CPC .......... *H04L 5/0094* (2013.01); *H04L 5/0039* (2013.01); *H04L 5/0048* (2013.01); *H04L 27/2613* (2013.01); *H04L 5/0051* (2013.01)

(58) Field of Classification Search
CPC . H04L 27/2613; H04L 5/0039; H04L 5/0048; H04L 5/0055; H04L 5/0094; H04L 5/0051; H04L 5/0037
See application file for complete search history.

(56) References Cited

U.S. PATENT DOCUMENTS

2016/0021653 A1 1/2016 Papasakellariou et al.
2017/0005765 A1* 1/2017 Park .................... H04L 27/2613

FOREIGN PATENT DOCUMENTS

CN 102224698 A 10/2011

OTHER PUBLICATIONS

"Link level evaluation and comparison of DMRS structures for short UL control channel", Intel Corporation, 3GPP TSG-RAN WG1 NR Ad-Hoc Meeting, R1-1700366, Spokane, USA, Jan. 16-20, 2017, pp. 1-6.

(Continued)

*Primary Examiner* — Dady Chery
(74) *Attorney, Agent, or Firm* — Sughrue Mion, PLLC

(57) ABSTRACT

Embodiments of the present disclosure relate to a solution for uplink signal receiving and transmission in a wireless communication system. Length indication information is transmitted to terminal devices. The length indication information indicates a length of reference signal sequences for uplink control information to be transmitted by different terminal devices in a short duration within the same transmission resource, which can be configured so that reference signals for the uplink control information of different terminal devices can be orthogonal with each other. The uplink control information and reference signals with the length of reference signal sequence as indicated by the length indication information can be received from the terminal devices. With embodiments of the present disclosure, a flexible, dynamic DMRS length indication solution is provided, which can address can address the orthogonality issue resulted from different sizes of UCI. In some embodiments, it can further address resource allocation issues related to UCI transmission in the short duration.

13 Claims, 8 Drawing Sheets

(56) References Cited

OTHER PUBLICATIONS

"Summary of e-mail discussions on uplink control signaling", Ericsson, TSG-RAN WG1 #87, R1-1613151, Reno, NV, USA, Nov. 14-18, 2016, pp. 1-23.
International Search Report for PCT/CN2017/072671 dated Oct. 19, 2017 [PCT/ISA/210].

* cited by examiner

Fig. 1A
Fig. 1B
Fig. 1C
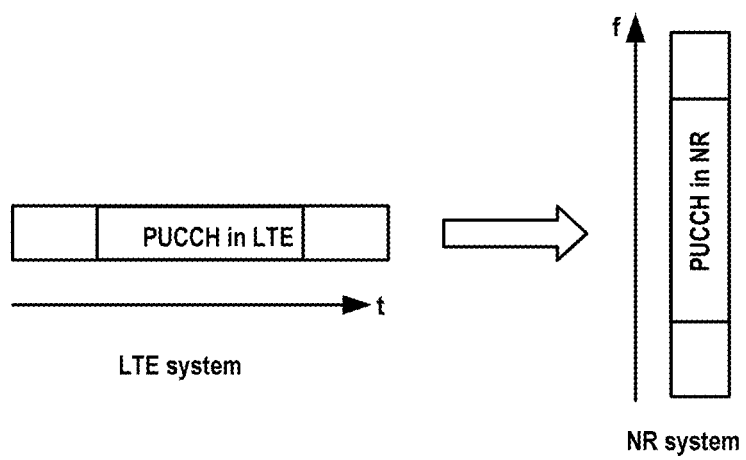
Fig. 1D
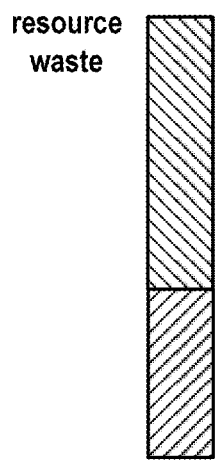
Fig. 2A
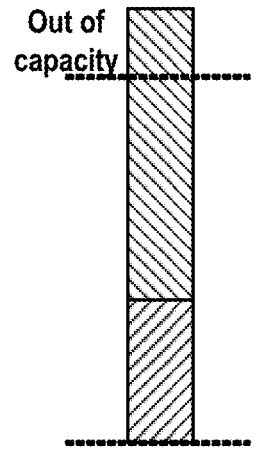
Fig. 2B

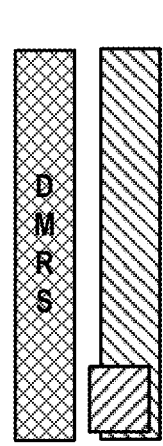
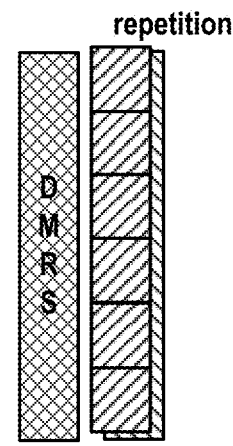
Fig. 6                    Fig. 7
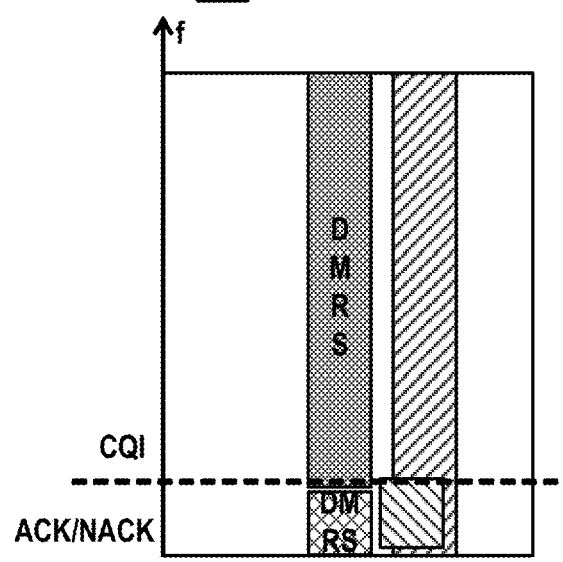
Fig. 8

Apparatus 1200

Length indication transmission module 1201

Signal receiving module 1202

Repetition indication transmission module 1203

Format indication transmission module 1204

Fig. 12

Apparatus 1300

Length indication receiving module 1301

Signal transmission module 1302

Repetition indication receiving module 1303

Format indication receiving module 1304

Fig. 13

METHODS AND APPARATUSES FOR UPLINK SIGNAL RECEIVING AND TRANSMISSION

CROSS REFERENCE TO RELATED APPLICATIONS

This is a continuation application of U.S. patent application Ser. No. 16/479,255, filed Jul. 19, 2019, which is a National Stage of International Application No. PCT/CN2017/072671, filed on Jan. 25, 2017, the disclosures of which are incorporated by reference herein in their entireties.

FIELD OF THE INVENTION

The non-limiting and exemplary embodiments of the present disclosure generally relate to the field of wireless communication techniques, and more particularly relate to methods and apparatuses for uplink signal receiving and transmission in a wireless communication system.

BACKGROUND OF THE INVENTION

New radio access system, which is also called as NR system or NR network, is the next generation communication system. In Radio Access Network (RAN) #71 meeting for the third generation Partnership Project (3GPP) working group, study of the NR system was approved. The NR system will consider frequency ranging up to 100 Ghz with an object of a single technical framework addressing all usage scenarios, requirements and deployment scenarios defined in Technical Report TR 38.913, which includes requirements such as enhanced mobile broadband, massive machine-type communications, and ultra reliable and low latency communications.

In addition, it is also required to study and identify the technical features necessary to enable the new radio access, including:
Efficient multiplexing of traffic for different services and use cases on the same contiguous block of spectrum
In RAN1 #86bis, it was agreed to use uplink (UL) control channel in a short duration around the last transmitted UL symbols(s):
At least two ways of transmission s are supported for NR UL control channel.
UL control channel can be transmitted in short duration around the last transmitted UL symbol(s) of a slot
FFS: How to define and treat the potential gap at the send of slot
FFS: in the positions, e.g., the first UL symbol(s) of a slot
TDMed and/or FDMed with UL data channel within a slot
UL control channel can be transmitted in long duration over multiple UL symbols to improve coverage
FDMed with UL data channel within a slot
FFS: How to Multiplex with SRS
The frequency resource and hopping, if hopping is used, may not spread over the carrier bandwidth
In RAN1 #87, it was further agreed that physical uplink control signaling should be able to carry at least hybrid-ARQ acknowledgements (like ACK/NACK), CSI reports (possibly including beamforming information), and scheduling request.

In the existing LTE system, UL control information (UCI) is transmitted in one subframe. For example, as illustrated in FIG. 1A, for format 1/1a/1b with normal cyclic prefix (CP), three SC-FDMA symbols in the middle of slot are used for DMRS transmission, while for the format 1/1a/1b with extended CP, two SC-FDMA symbols are used for DMRS transmission; as illustrated in FIG. 1B, for format 2/2a/2b with normal CP, symbols 1 and 5 within SC-FDMA symbols are used for DMRS transmission, wherein format 2a/2b only support normal CP; as illustrated in FIG. 1C, regarding format 2 with extended CP, symbol 3 SC-FDMA symbols of the slot are used for DMRS transmission.

Thus, in the LTE system, the UCI is transmitted in one subframe (as illustrated in FIG. 1D), while different from the LTE system, in the NR system, the UCI is transmitted in a short duration, for example, in the last symbol(s) of a slot in NR. Therefore, transmission time of UCI in the NR system is much shorter than that in the LTE system, which means it will need more frequency resource for Physical Uplink Control Channel (PUCCH) in the NR system, which might cause a problem of frequency resource allocation.

In U.S. Pat. No. 8,989,169B2, there was proposed a method for transmitting control information in wireless mobile communication system in which different PUCCHs are multiplexed in frequency division multiplexing (FDM). In such a case, there might be frequency resource allocation issues. For example, if there are server terminal device, there will be resource waste problem, while if there are a lot of UEs, there might be out of capacity problem due to the limited resource, as illustrated in FIG. 2A and FIG. 2B respectively.

SUMMARY OF THE INVENTION

In the present disclosure, there is provided a new solution for uplink signal receiving and transmission in a wireless communication system, to mitigate or at least alleviate at least part of the issues in the prior art.

According to a first aspect of the present disclosure, there is provided a method of uplink signal receiving in a wireless communication system. The method comprises transmitting, to terminal devices, length indication information, which indicates a length of reference signal sequences for uplink control information to be transmitted by different terminal devices in a short duration within the same transmission resource, wherein the length of reference signal sequences can be configured so that reference signals for the uplink control information of different terminal devices can be orthogonal with each other. Alternatively or additionally, the method can comprise receiving, from the terminal devices, the uplink control information and reference signals with the length of reference signal sequence as indicated by the length indication information.

According to a second aspect of the present disclosure, there is provided a method of uplink signal transmission in a wireless communication system. The method may comprise receiving length indication information indicating a length of reference signal sequences for uplink control information to be transmitted in a short duration, the length of reference signal sequence being configured so that a reference signal for the uplink control information can be orthogonal with another reference signal for uplink control information to be transmitted by another terminal device within the same transmission resource. Alternatively or additionally, the method can comprise transmitting the uplink control information and a reference signal with the length of reference signal sequence as indicated by the length indication information.

According to a third aspect of the present disclosure, there is provided an apparatus of uplink signal receiving in a wireless communication system. The apparatus comprises: a length indication transmission module and a signal receiving module. The length indication transmission module can be configured to transmit, to terminal devices, length indication information indicating a length of reference signal sequences for uplink control information to be transmitted by different terminal devices in a short duration within the same transmission resource, the length of reference signal sequences being configured so that reference signals for the uplink control information of the different terminal devices can be orthogonal with each other. The signal receiving module can be configured to receive, from terminal devices, the uplink control information and reference signals with the length of reference signal sequence as indicated by the length indication information.

According to a fourth aspect of the present disclosure, there is provided an apparatus of uplink signal transmission in a wireless communication system. The apparatus may comprise: a length indication receiving module and a signal transmission module. The length indication receiving module can be configured to receive length indication information indicating a length of reference signal sequences for uplink control information to be transmitted in a short duration, the length of reference signal sequence being configured so that a reference signal for the uplink control information can be orthogonal with another reference signal for uplink control information to be transmitted by another terminal device within the same transmission resource. The signal transmission module can be configured to transmit the uplink control information and a reference signal with the length of reference signal sequence as indicated by the length indication information.

According to a fifth aspect of the present disclosure, there is provided a computer-readable storage media with a computer program code embodied thereon, the computer program code being configured to, when executed, cause an apparatus to perform actions in the method according to any embodiment in the first aspect.

According to a sixth aspect of the present disclosure, there is provided a computer-readable storage media with a computer program code embodied thereon, the computer program code being configured to, when executed, cause an apparatus to perform actions in the method according to any embodiment in the second aspect.

According to a seventh aspect of the present disclosure, there is provided a computer program product comprising a computer-readable storage media according to the fifth aspect.

According to an eighth aspect of the present disclosure, there is provided a computer program product comprising a computer-readable storage media according to the sixth aspect.

With embodiments of the present disclosure, a flexible, dynamic DMRS length indication solution is provided and different terminal devices transmit UCI within the same transmission, which can address resource allocation issues like resource waste, or out of capacity related to UCI transmission in the short duration, and at the same time, there is no orthogonality issue resulted from different sizes of UCI information.

BRIEF DESCRIPTION OF THE DRAWINGS

The above and other features of the present disclosure will become more apparent through detailed explanation on the embodiments as illustrated in the embodiments with reference to the accompanying drawings, throughout which like reference numbers represent same or similar components and wherein:

FIGS. 1A to 1C schematically illustrate UL control channels in the LTE system;

FIG. 1D schematically illustrates PUCCH transmissions in the LTE system and the NR system;

FIGS. 2A to 2B schematically illustrate example potential issues associated with UCI transmission in a short duration;

FIG. 6 schematically illustrates RS sequence length determination for different types of UCI according to an example embodiment of the present disclosure;

FIG. 7 schematically illustrates RS sequence length determination for different types of UCI according to another example embodiment of the present disclosure;

FIG. 8 schematically illustrates RS sequence length determination for different types of UCI according to a further example embodiment of the present disclosure;

FIG. 12 schematically illustrates a block diagram of an apparatus for uplink signal receiving according to an embodiment of the present disclosure;

FIG. 13 schematically illustrates a block diagram of an apparatus for uplink signal transmission according to an embodiment of the present disclosure.

DETAILED DESCRIPTION OF EMBODIMENTS

Hereinafter, the solution as provided in the present disclosure will be described in details through embodiments with reference to the accompanying drawings. It should be appreciated that these embodiments are presented only to enable those skilled in the art to better understand and implement the present disclosure, not intended to limit the scope of the present disclosure in any manner.

In the accompanying drawings, various embodiments of the present disclosure are illustrated in block diagrams, flow charts and other diagrams. Each block in the flowcharts or blocks may represent a module, a program, or a part of code, which contains one or more executable instructions for performing specified logic functions, and in the present disclosure, a dispensable block is illustrated in a dotted line. Besides, although these blocks are illustrated in particular sequences for performing the steps of the methods, as a matter of fact, they may not necessarily be performed strictly according to the illustrated sequence. For example, they might be performed in reverse sequence or simultaneously, which is dependent on natures of respective operations. It should also be noted that block diagrams and/or each block in the flowcharts and a combination of thereof may be implemented by a dedicated hardware-based system for performing specified functions/operations or by a combination of dedicated hardware and computer instructions.

Generally, all terms used in the claims are to be interpreted according to their ordinary meaning in the technical field, unless explicitly defined otherwise herein. All references to "a/an/the/said [element, device, component, means, step, etc.]" are to be interpreted openly as referring to at least one instance of said element, device, component, means, modules, unit, step, etc., without excluding a plurality of such devices, components, means, modules, units, steps, etc., unless explicitly stated otherwise. Besides, the indefinite article "a/an" as used herein does not exclude a plurality of such steps, units, modules, devices, and objects, and etc.

Additionally, in a context of the present disclosure, a user equipment (UE) may refer to a terminal, a Mobile Terminal (MT), a subscriber station, a portable subscriber station, Mobile Station (MS), or an Access Terminal (AT), and some or all of the functions of the UE, the terminal, the MT, the SS, the portable subscriber station, the MS, or the AT may be included. Furthermore, in the context of the present disclosure, the term "BS" may represent, e.g., a node B (NodeB or NB), an evolved NodeB (eNodeB or eNB), gNB (Node B in NR), a radio header (RH), a remote radio head (RRH), a relay, or a low power node such as a femto, a pico, and so on.

Hereinafter, description will be first made to example multiplexing mode for RS and UCI transmission in the NR system to facilitate the understanding of embodiment of the present disclosure.

Figure 3A:
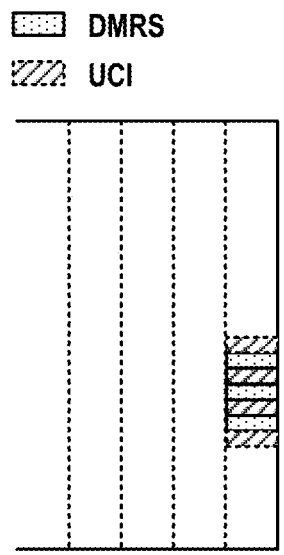
FIGS. 3A to 3C schematically illustrate several multiplexing modes for RS and UCI transmissions according to an example embodiment of the present disclosure.
Figure 3B:
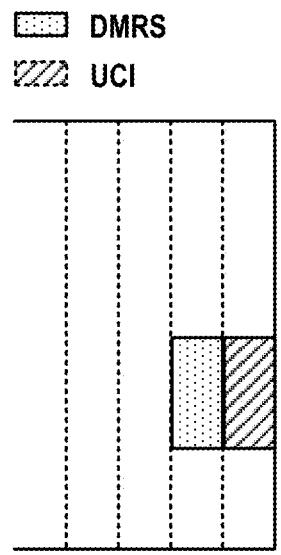
Figure 3C:
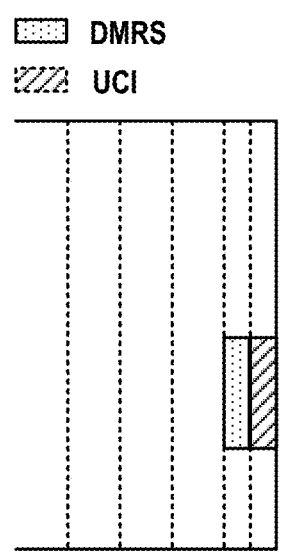

FIGS. 3A to 3C schematically illustrate example multiplexing modes for RS and UCI transmission according to an example embodiment of the present disclosure. As illustrated in FIG. 3A, in the multiplexing mode, the UCI and DMRS are transmitted on one-symbol short PUCCH with the same numerology as data; and RS and UCI are multiplexed in a frequency division mode (FDM). As illustrated in FIG. 3B, in the multiplexing mode, the UCI and DMRS are transmitted on two-symbol short PUCCH with the same numerology as data; and RS and UCI are multiplexed in a time division mode (TDM). As illustrated in FIG. 3C, in the multiplexing mode, the UCI and DMRS are transmitted on two-symbol (mini-symbol) short PUCCH with a higher subcarrier spacing numerology than data (e.g. doubled subcarrier spacing compared to data); and RS and UCI are multiplexed in a time division mode (TDM).

Figure 4:
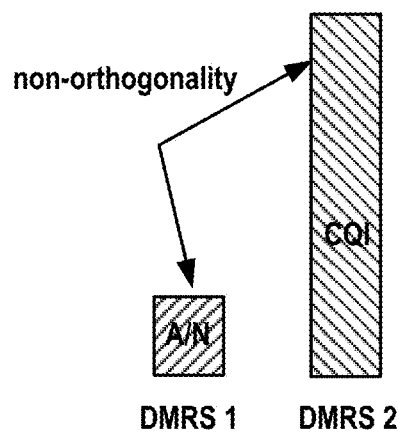
FIG. 4 schematically illustrates non-orthogonality among different types of UCI associated with UCI transmission in a short duration.

However, these three multiplexing modes are all involved in those issues related to UCI transmission in the short duration, like resource allocation issues such as resource waste, or out of capacity. Thus, in the present disclosure, it is proposed to tackle these issues by transmitting the UCI for different terminal devices in the same transmission resource. However, it is further noticed that different uplink control information (UCI), like Channel Quality Indication (CQI) or ACK/NACK, need different resource sizes. Therefore, as illustrated in FIG. 4, reference signal (RS) sequences (such as Zadoff-Chu (ZC) sequences) used for different UCI will have different lengths, but RS sequences of different lengths will not be orthogonal with each other, which might render interference issues.

Thus, in the present disclosure, it is to propose a new solution for uplink signal receiving and transmission in a wireless network. In the solution, a reference signal length is determined flexibly and dynamically and different terminal devices transmit UCI within the same transmission, thus it could address resource allocation (like resource waste, or out of capacity) related to UCI transmission in the short duration without the orthogonality issue resulted from different sizes of UCI information. Hereinafter, reference will be made to FIGS. 5 to 14 to describe the solution for uplink signal receiving and transmission in a wireless network as provided in the present disclosure.

Figure 5:
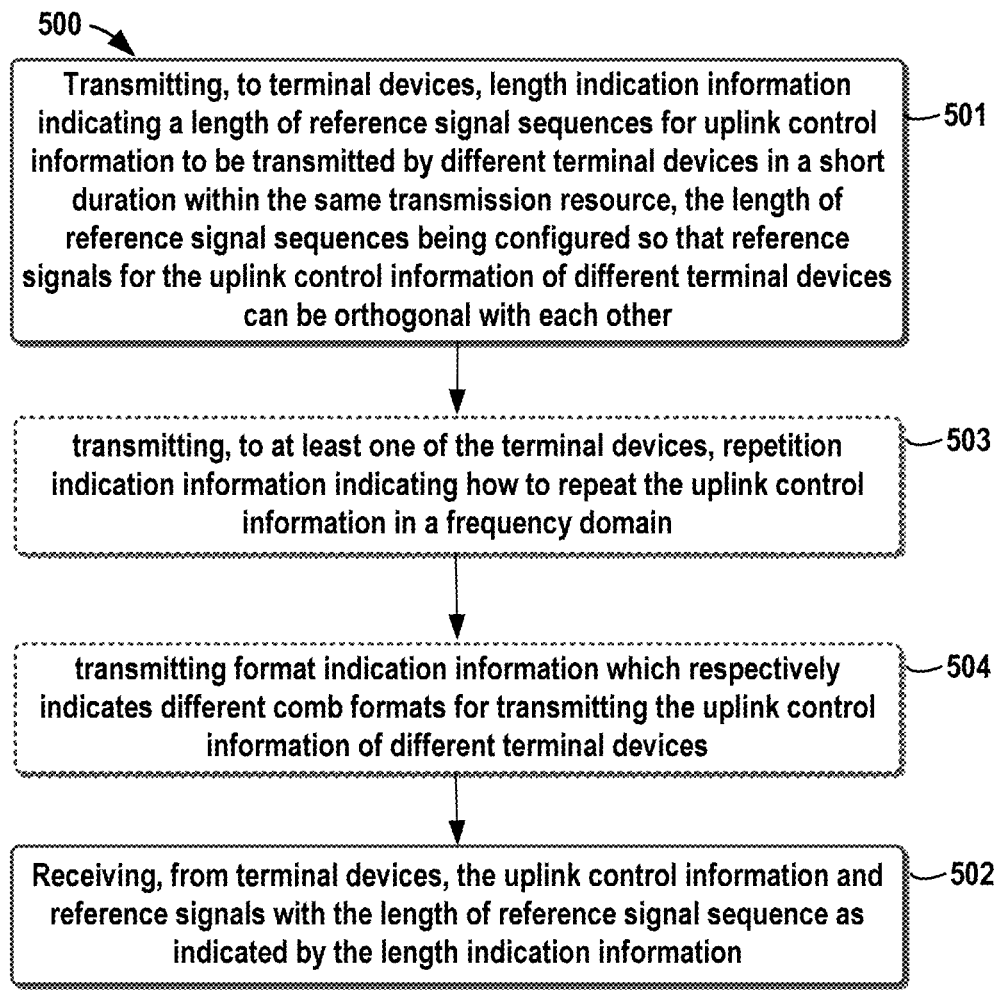
FIG. 5 schematically illustrates a flow chart of a method for uplink signal receiving according to an example embodiment of the present disclosure.

FIG. 5 schematically illustrates a flow chart of a method for uplink signal receiving according to an example embodiment of the present disclosure. The method 500 can be performed at a serving node, for example a BS, like a node B (NodeB or NB).

As illustrated in FIG. 5, the method starts from step 501, in which length indication information is transmitted to terminal devices. The length indication information indicates a length of reference signal sequences for uplink control information to be transmitted by different terminal devices in a short duration within the same transmission resource. In other words, for those terminal devices, which are to transmit UCI in the short duration using the same time-frequency resource, an indication will be transmitted to them to indicate the common length of UCI for the terminal devices. In an embodiment of the present disclosure, the length of reference signal sequences is configured so that reference signals for the uplink control information of different terminal devices can be orthogonal with each other.

In an embodiment of the present disclosure, the length indication information can be explicit indication information. For example, the indication length information can directly indicate the length of RS; or the indication length information can indicate RS resource allocation, from which the length of RS can be learned directly. In another embodiment of the present disclosure, the length indication information can be implicit indication information. For example, the length indication information can comprise UCI resource allocations, for example the length of allocated UCI resource, from which the terminal device can derive the length of RS sequence based on similar way to that at the serving node.

In embodiments of the present disclosure, for the UCI transmissions of different terminal devices in the short duration, the common length of reference signal sequences will be first determined at the network side and then notified to these terminal devices prior to transmission of the reference signals and the UCI. As mentioned hereinbefore, for different types of UCI, they need different resource sized and thus the length of reference signals for these UCI might be different. However, in embodiments of the present disclosure, the serving node can know sizes of PUCCHs for different UEs and thus it can determine the length of reference signal sequences, which is common for different terminal devices. The length of reference signal sequence can be dynamically transmitted to terminal devices, for example through a higher layer signaling, like a Radio Resource Control (RRC) signaling. In such a way, the same length of reference signals can be used for different terminal devices and thus reference signals for the uplink control information of different terminal devices can be orthogonal with each other. In the following, several example RS sequence length determinations will be described only for illustrative purposes and those skilled in the art will understand that the present disclosure are not only limited thereto.

Reference is then made to FIG. 6, which illustrates RS sequence length determination for different types of UCI according to an example embodiment of the present disclosure. As illustrated in FIG. 6, UE1 and UE2 are both allocated with the same time-frequency resource. UE1 is to transmit ACK/NACK while UE2 is to transmit CQI. ACK/NACK and CQI are two different types of UCI, they contain different amounts of information and thus require different resource sizes. The serving node can determine the length of RS sequence based on the sizes of PUCCH of UE1 and UEs which are known by the serving node.

In an embodiment of the present disclosure, the length of RS sequence can be determined as the largest one of resource sizes required for the uplink control information of different terminal devices. Thus, the length of RS sequence for UCI can be the same and the orthogonality issue can be addressed.

In another embodiment of the present disclosure, the RS can assume an Interleaved Frequency Division Multiple Access (IFMDA) structure in which the reference signals of different terminal devices occupy different subcarriers within the allocated resources. For example, one user occupies subcarriers with even numbers while the other user occupies subcarriers with odd numbers. In such case, the length of RS sequence can be determined as being smaller than the largest one of resource sizes required for the uplink control information of different terminal devices. Thus, the length of RS sequence for UCI can be still identical for different terminal devices and the orthogonality among reference signals can be ensured.

Regarding the remaining transmission resource for UE1, i.e., those not including resource for ACK/NACK, it can be used for other information transmission of UE1 or information transmission for other terminal devices.

FIG. 7 schematically illustrates RS sequence length determination for different types of UCI according to another example embodiment of the present disclosure. The solution as illustrated in FIG. 7 is similar to that as illustrated in FIG. 6 but the difference lies in that the remaining transmission resource for UE1 in FIG. 6 is not used for other information transmission but for repeating the UCI transmission of UE1. In other words. The ACK/NACK will be transmitted repeatedly within the common transmission resource for the terminal devices, since the resource size for ACK/NACK is much smaller than that for CQI.

In such a case, in step 503 of FIG. 5, the method can additionally transmit, to at least one of the terminal devices (e.g., one or more terminal devices with a smaller resource requirement), repetition indication information indicating how to repeat the UCI in a frequency domain. The repletion indication information can, for example, indicate the number of transmission of UCI within the allocated transmission resource.

In another embodiment of the present disclosure, the uplink control information of same information type for different terminal devices can be multiplexed in a code division multiplexing mode, and thus the length of reference signal sequence can be determined for a respective information type based on a resource size of uplink control information of the respective information type. On the other hand, different types of UCI can be multiplexed for example, in FDM mode, or in any other mode like TDD.

FIG. 8 schematically illustrates RS sequence length determination for different types of UCI according to a further example embodiment of the present disclosure. In FIG. 8, UE1 and UE2 were both allocated with the same time-frequency resource. The UE1 it to transmit ACK/NACK and UE2 is to transmit ACK/NACK and CQI. The serving node can distribute the transmission resource so that the different types of UCI, e.g., ACK/NACK and CQI, can be cascaded in the frequency domain. In other word, transmission recourses for CQI immediately follow those for ACK/NACK, as illustrated in FIG. 8. The uplink control information of same information type for different terminal devices can be multiplexed, for example, in a code division multiplexing mode, in space division multiplexing, or in any other proper multiplexing mode. In such a case, the length of reference signal sequence can be determined for a respective information type based on a resource size of uplink control information of the respective information type. Namely, it just needs to ensure that the length of reference signal sequence is the same for the same type of UCI so that RS for the same type of UCI can be orthogonal with each other. In other word, the length of RS sequence might be different for different types of UCI. As illustrated in FIG. 8, DMRS for ACK/NACK is determined as the resource size required for ACK/NACK while DMRS is determined as the resource size required for the CQI. Despite different length of DRMS for ACK/NACK and CQI, there will not be any orthogonality issue since RS for the same type of UCI are ensured to be orthogonal with each other.

Next reference is to be made back to FIG. 5. As illustrated in FIG. 5, alternatively or additionally, at step 502, the serving node receives, from the terminal devices, the uplink control information and reference signals with the length of reference signal sequence as indicated by the length indication information.

In an embodiment of the present disclosure, the reference signal can be obtained by using Zadoff-Chu sequences. In another embodiment of the present disclosure, the reference signal can be based orthogonal convolutional codes (OCC). For example, if UL control channel uses Cyclic Prefix Orthogonal Frequency Division Multiplexing (CP-OFDM), the OCC could be used to orthogonalize DMRS of different terminal devices. In such case, the serving node can indicate which OCC is used for respective terminal devices, e.g., UE1 and UE2.

In addition, it is also possible to use other sequences to obtain the reference signals. The skilled in the art shall understand that the present discloses is not only limited thereto. All of other possible sequences fall within the scope of the present disclosure.

In another embodiment of the present disclosure, different terminal devices can use different comb formats to transmit UCI. In other words, different terminal devices can use different offsets for UCI transmissions. In such a case, in step 504 of FIG. 5, the serving node may further transmit format indication information which respectively indicates different comb formats for transmitting the UCI of different terminal devices.

Figure 9:
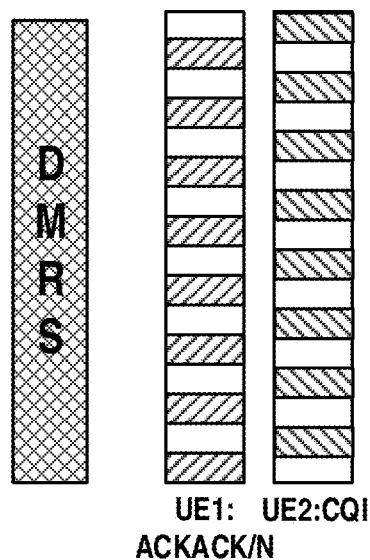
FIG. 9 schematically illustrates UCI transmissions for different terminal devices according to an embodiment of the present disclosure.

FIG. 9 schematically illustrates UCI transmissions for different terminal devices according to an embodiment of the present disclosure. As illustrated in FIG. 9, the DMRS has the same length for UE1 and UE2 and at the same time, UE1 and UE2 can multiplex their respective UCI in different comb formats. For example, UE1 and UE2 can occupy the same amount of transmission resource and transmit their respective UCI in an alternative way, as illustrated in FIG. 9. In this case, the ACK/NACK transmission can be repeated within the allocated transmission resource.

Figure 10:
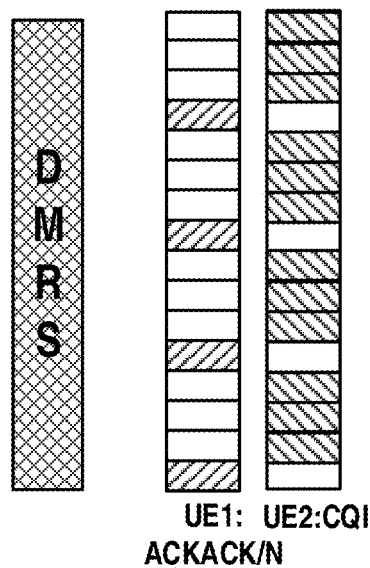
FIG. 10 schematically illustrates UCI transmissions for different terminal devices according to another embodiment of the present disclosure.

FIG. 10 schematically illustrates UCI transmission for different terminal devices according to another embodiment of the present disclosure. As illustrated in FIG. 10, the DMRS also has the same length for UE1 and UE2 and at the same time, UE1 and UE2 can multiplex their respective UCI in different comb formats. In FIG. 10, UE1 and UE2 transmit their respective UCI in an alternative way, but different from FIG. 9, UE2 uses more frequency transmission resources than UE1. In this case, the ACK/NACK are not repeated or are just repeated less.

The DMRS and the UCI can be transmitted in many different ways. In an embodiment of the present disclosure, the uplink control information and the reference signal are multiplexed in a frequency division multiplexing mode with a regular carrier spacing. In another embodiment of the present disclosure, the uplink control information and the reference signal are multiplexed in a time division multiplexing mode. In a further embodiment of the present disclosure, the uplink control information and the reference signal are multiplexed in frequency division multiplexing mode with an extended carrier spacing.

Hereinafter, description will be then made to FIG. 11 to further disclose the uplink signal transmission solution as provided in the present disclosure.

Figure 11:
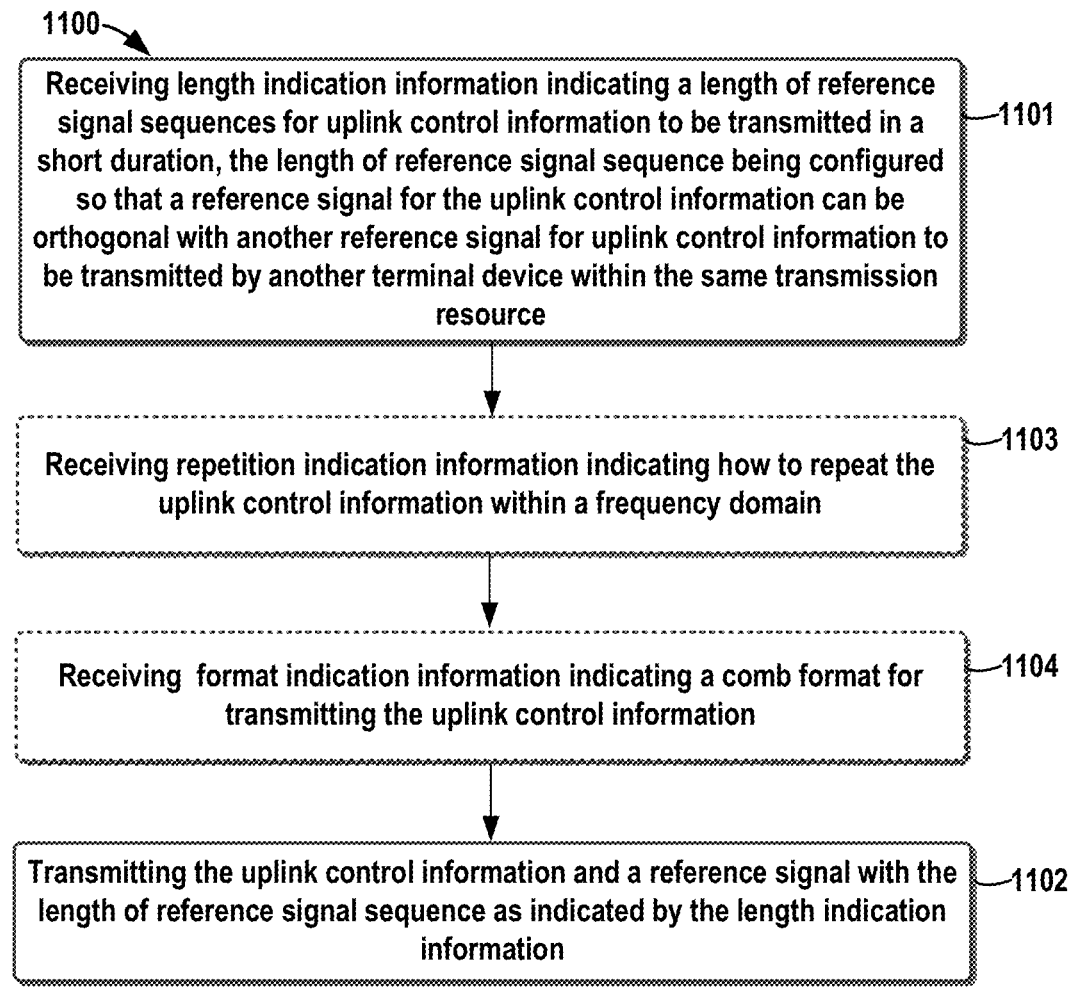
FIG. 11 schematically illustrates a flow chart of a method for uplink signal transmission according to an embodiment of the present disclosure.

FIG. 11 schematically illustrates a flow chart of a method for uplink signal transmission according to an embodiment of the present disclosure. The method 1100 can be implemented at a terminal device, for example UE, or other like terminal devices.

As illustrated in FIG. 11, the method can start from step 1101, in which the terminal device receives length indication information indicating a length of reference signal sequences for uplink control information to be transmitted in a short duration. The length of reference signal sequence can be configured so that a reference signal for the uplink control information can be orthogonal with another reference signal for uplink control information to be transmitted by another terminal device within the same transmission resource.

Based on the length indication information, the terminal device can transmit the uplink control information and a reference signal to the serving node in step S1102, wherein the reference signal will have the length of reference signal sequence as indicated by the length indication information.

In an embodiment of the present disclosure, the terminal device may further receive repetition indication information which indicates how to repeat the uplink control information within a frequency domain, as illustrated in step 1103. In such a case, the terminal device may repeat the uplink control information within the frequency domain based on the repetition indication information.

In another embodiment of the present disclosure, the terminal device may multiplex the transmitted uplink control information with another uplink control information of same information type transmitted by another terminal device within the same transmission resource in a code division multiplexing mode.

In a further embodiment of the present disclosure, the uplink control information of different information types can be multiplexed in a frequency division multiplexing mode.

In a yet further embodiment of the present disclosure, the method may further comprise receiving format indication information indicating a comb format for transmitting the uplink control information in step 1104. In such a case, the terminal device can transmit the uplink control information in the comb format as indicated by the format indication information.

In a still further embodiment of the present disclosure, the reference signal sequence can be generated by using any of Zadoff-Chu sequences, orthogonal convolutional codes, or other sequences.

In a yet still further embodiment of the present disclosure, the uplink control information and the reference signal can be multiplexed in any of: a frequency division multiplexing mode with a regular carrier spacing; a time division multiplexing mode; and a frequency division multiplexing mode with a doubled or bigger carrier spacing.

In addition, in the present disclosure, there are also provided apparatuses for uplink signal receiving and transmission, which will be described with reference to FIGS. 12 and 13.

FIG. 12 schematically illustrates a block diagram of an apparatus for uplink signal receiving according to an embodiment of the present disclosure. As illustrated in FIG. 12, the apparatus 1200 may comprise one or more of a length indication transmission module 1201 and a signal receiving module 1202. The apparatus 1200 can be implemented at a serving node, for example a BS, like a node B (NodeB or NB).

The length indication transmission module 1201 can be configured to transmit, to terminal devices, length indication information indicating a length of reference signal sequences for uplink control information to be transmitted by different terminal devices in a short duration within the same transmission resource, wherein the length of reference signal sequences can be configured so that reference signals for the uplink control information of the different terminal devices can be orthogonal with each other. The signal receiving module 1202 can be configured to receive, from the terminal devices, the uplink control information and reference signals with the length of reference signal sequence as indicated by the length indication information.

In an embodiment of the present disclosure, the length of reference signal sequence can be determined based on the largest one of resource sizes required for the uplink control information of different terminal devices.

In another embodiment of the present disclosure, the method may further comprise a repetition indication transmission module 1203, which is configured to transmit, to at least one of the terminal devices, repetition indication information indicating how to repeat the uplink control information in a frequency domain.

In another embodiment of the present disclosure, the uplink control information of same information type for different terminal devices can be multiplexed in a code division multiplexing mode. In such a case, the length of reference signal sequence can be determined for a respective information type based on a resource size of uplink control information of the respective information type.

In a further embodiment of the present disclosure, the uplink control information of different information types can be multiplexed in a frequency division multiplexing mode.

In a yet further embodiment of the present disclosure, apparatus 1200 further comprises a format indication transmission module 1204. The format indication transmission module 1204 can be configured to transmit format indication information, which respectively indicates different comb formats for transmitting the uplink control information of different terminal devices.

In another embodiment of the present disclosure, the reference signal can be obtained by using any of Zadoff-Chu sequences, or orthogonal convolutional codes.

In a further embodiment of the present disclosure, the uplink control information and the reference signal are multiplexed in any of a frequency division multiplexing mode with a regular carrier spacing; a time division multiplexing mode; and a frequency division multiplexing mode with an extended carrier spacing.

FIG. 13 schematically illustrates a block diagram of an apparatus for uplink signal transmission according to an embodiment of the present disclosure. The apparatus 1300 can be implemented at a terminal device, for example UE, or other like terminal devices.

As illustrated in FIG. 13, the apparatus 1300 may comprise one or more of a length indication receiving module 1301 and a signal transmission module 1302.

The length indication receiving module 1301 can be configured to receive length indication information indicating a length of reference signal sequences for uplink control information to be transmitted in a short duration, the length of reference signal sequence being configured so that a reference signal for the uplink control information can be orthogonal with another reference signal for uplink control information to be transmitted by another terminal device within the same transmission resource. The signal transmission module 1302 can be configured to transmit the uplink control information and a reference signal with the length of reference signal sequence as indicated by the length indication information.

In an embodiment of the present disclosure, the apparatus 1300 may further comprise a repetition indication receiving module 1303, which can be configured to receive repetition indication information indicating how to repeat the uplink control information within a frequency domain. The signal transmission module 1302 is configured to repeat the uplink control information within the frequency domain based on the repetition indication information.

In another embodiment of the present disclosure, the signal transmission module 1302 can be configured to multiplex the transmitted uplink control information with another uplink control information of same information type transmitted by another terminal device within the same transmission resource in a code division multiplexing mode.

In a further embodiment of the present disclosure, the uplink control information of different information types can be multiplexed in a frequency division multiplexing mode.

In a yet further embodiment of the present disclosure, the apparatus 1300 may further comprise a format indication receiving module 1304, which is configured to receive format indication information indicating a comb format for transmitting the uplink control information. The signal transmission module 1304 may be configured to transmit the uplink control information in the comb format as indicated by the format indication information.

In a yet embodiment of the present disclosure, the reference signal sequence can be generated by using any of Zadoff-Chu sequences, orthogonal convolutional codes, or any other suitable sequences.

In a still yet embodiment of the present disclosure, the signal transmission module 1302 can be configured to multiplex the uplink control information and the reference signal in any of: a frequency division multiplexing mode with a regular carrier spacing; a time division multiplexing mode; and a frequency division multiplexing mode with a doubled or bigger carrier spacing.

It shall be appreciated that hereinbefore, the apparatuses 1200 and 1300 are described with reference to FIGS. 12 and 13. It is noted that the apparatuses 1200 and 1300 may be configured to implement functionalities as described with reference to FIGS. 5 to 11. Therefore, for details about the operations of modules in these apparatuses, one may refer to those descriptions made with respect to the respective steps of the methods with reference to FIGS. 5 to 11.

It is further noted that components of the apparatuses 1200 and 1300 may be embodied in hardware, software, firmware, and/or any combination thereof. For example, these components of apparatuses 1200 and 1300 may be respectively implemented by a circuit, a processor or any other appropriate selection device.

Those skilled in the art will appreciate that the aforesaid examples are only for illustration not limitation and the present disclosure is not limited thereto; one can readily conceive many variations, additions, deletions and modifications from the teaching provided herein and all these variations, additions, deletions and modifications fall the protection scope of the present disclosure.

In addition, in some embodiment of the present disclosure, each of apparatuses 1200 and 1300 may comprise at least one processor. The at least one processor suitable for use with embodiments of the present disclosure may include, by way of example, both general and special purpose processors already known or developed in the future. Each of apparatuses 1200 and 1300 may further comprise at least one memory. The at least one memory may include, for example, semiconductor memory devices, e.g., RAM, ROM, EPROM, EEPROM, and flash memory devices. The at least one memory may be used to store program of computer executable instructions. The program can be written in any high-level and/or low-level compliable or interpretable programming languages. In accordance with embodiments, the computer executable instructions may be configured, with the at least one processor, to cause apparatuses 1200 and 1300 to at least perform operations according to the method as discussed with reference to FIGS. 5 to 11 respectively.

Figure 14:
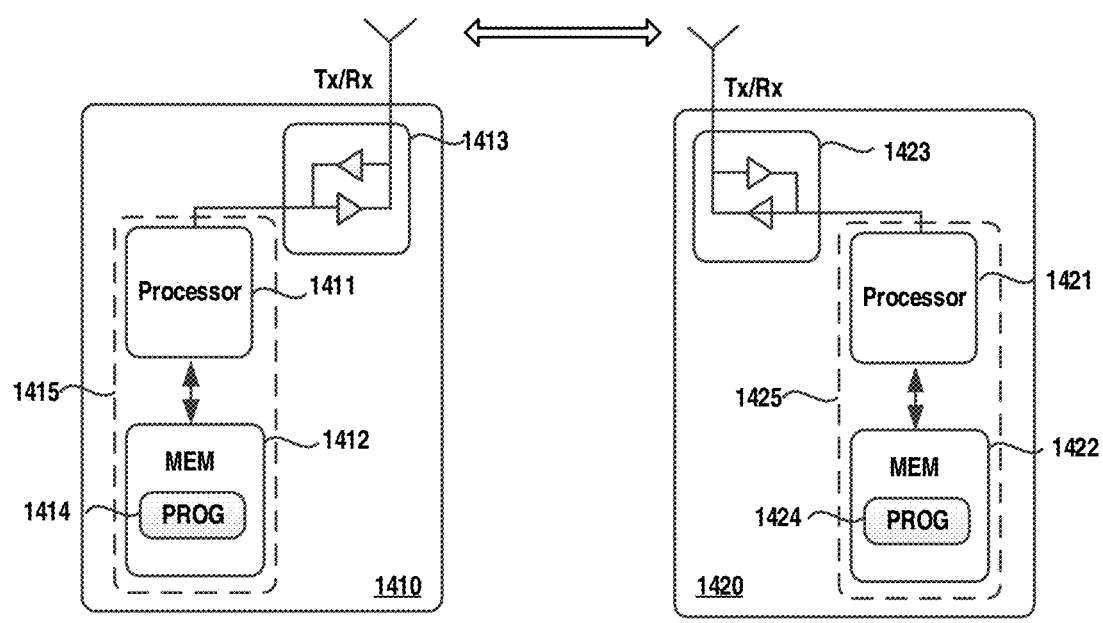
FIG. 14 schematically illustrates a simplified block diagram of an apparatus 1410 that may be embodied as or comprised in a serving node like a base station in a wireless network and an apparatus 1420 that may be embodied as or comprised in a terminal device like UE as described herein.

FIG. 14 further illustrates a simplified block diagram of an apparatus 1410 that may be embodied as or comprised in a serving node like a base station in a wireless network and an apparatus 1420 that may be embodied as or comprised in a terminal device like UE as described herein.

The apparatus 1410 comprises at least one processor 1411, such as a data processor (DP) and at least one memory (MEM) 1412 coupled to the processor 1411. The apparatus 1410 may further comprise a transmitter TX and receiver RX 1413 coupled to the processor 1411, which may be operable to communicatively connect to the apparatus 1420. The MEM 1412 stores a program (PROG) 1414. The PROG 1414 may include instructions that, when executed on the associated processor 1411, enable the apparatus 1410 to operate in accordance with embodiments of the present disclosure, for example the method 500. A combination of the at least one processor 1411 and the at least one MEM 1412 may form processing means 1415 adapted to implement various embodiments of the present disclosure.

The apparatus 1420 comprises at least one processor 1421, such as a DP, and at least one MEM 1422 coupled to the processor 1421. The apparatus 1420 may further comprise a suitable TX/RX 1423 coupled to the processor 1421, which may be operable for wireless communication with the apparatus 1410. The MEM 1422 stores a PROG 1424. The PROG 1424 may include instructions that, when executed on the associated processor 1421, enable the apparatus 1420 to operate in accordance with the embodiments of the present disclosure, for example to perform the method 1100. A combination of the at least one processor 1421 and the at least one MEM 1422 may form processing means 1425 adapted to implement various embodiments of the present disclosure.

Various embodiments of the present disclosure may be implemented by computer program executable by one or more of the processors 1411, 1421, software, firmware, hardware or in a combination thereof.

The MEMs 1412 and 1422 may be of any type suitable to the local technical environment and may be implemented using any suitable data storage technology, such as semiconductor based memory devices, magnetic memory devices and systems, optical memory devices and systems, fixed memory and removable memory, as non-limiting examples.

The processors 1411 and 1421 may be of any type suitable to the local technical environment, and may include one or more of general purpose computers, special purpose computers, microprocessors, digital signal processors DSPs and processors based on multicore processor architecture, as non-limiting examples.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with one embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method performed by a device comprising:
    determining first frequency resource information and second frequency resource information for at least one control information;
    determining length information of a reference signal based on third frequency resource information for the at least one control information; and
    receiving the reference signal and the at least one control information.

2. The method of claim 1, wherein a resource size indicated by the first frequency resource information is different from a resource size indicated by the second frequency resource information.

3. The method of claim 1, wherein a resource size indicated by the third frequency resource information is larger than a resource size indicated by at least one of the first frequency resource information and the second frequency resource information.

4. The method of claim 1, wherein frequency resources indicated by the first frequency resource information and the second frequency resource information are within a frequency resource indicated by the third frequency resource information.

5. The method of claim 1, wherein a frequency resource indicated by the third frequency resource information is same with a frequency resource indicated by the first frequency resource information.

6. The method of claim 1, further comprising:
    receiving the first frequency resource information, the second frequency resource information, and the third frequency resource information.

7. A communication device comprising:
    a processor configured to:
    determine first frequency resource information and second frequency resource information for at least one control information;
    determine length information of the reference signal based on third frequency resource information for the at least one control information; and
    receive a reference signal and the and the at least one control information.

8. The communication device of claim 7, wherein a resource size indicated by the first frequency resource information is different from a resource size indicated by the second frequency resource information.

9. The communication device of claim 7, wherein a resource size indicated by the third frequency resource information is larger than a resource size indicated by at least one of the first frequency resource information and the second frequency resource information.

10. The communication device of claim 7, wherein frequency resources indicated by the first frequency resource information and the second frequency resource information are within a frequency resource indicated by the third frequency resource information.

11. The communication device of claim 7, wherein a frequency resource indicated by the third frequency resource information is same with a frequency resource indicated by the first frequency resource information.

12. The communication device of claim 7, wherein the processor is further configured to receive the first frequency resource information, the second frequency resource information, and the third frequency resource information.

13. A communication method comprising:
  transmitting first frequency resource information, second frequency resource information, and third frequency resource information for at least one control information, wherein length information of a reference signal is determined based on the third frequency resource information; and
  transmitting the reference signal and the at least one control information.

* * * * *